US012572734B1

(12) United States Patent
Bhasker et al.

(10) Patent No.: US 12,572,734 B1
(45) Date of Patent: Mar. 10, 2026

(54) MACHINE LEARNING GRAMMAR RULE GENERATION

(71) Applicant: Amazon Technologies, Inc., Seattle, WA (US)

(72) Inventors: Bhavana Bhasker, Bellevue, WA (US); Advika Battini, Seattle, WA (US); Christopher Michael Raczynski, Phoenix, AZ (US); Kimberly M. Smith, SeaTac, WA (US)

(73) Assignee: Amazon Technologies, Inc., Seattle, WA (US)

( * ) Notice: Subject to any disclaimer, the term of this patent is extended or adjusted under 35 U.S.C. 154(b) by 758 days.

(21) Appl. No.: 17/936,140

(22) Filed: Sep. 28, 2022

(51) Int. Cl.
*G06F 40/211* (2020.01)
*G06F 18/214* (2023.01)
*G06F 40/30* (2020.01)

(52) U.S. Cl.
CPC ........ *G06F 40/211* (2020.01); *G06F 18/2148* (2023.01); *G06F 40/30* (2020.01)

(58) Field of Classification Search
CPC ..... G06F 40/211; G06F 18/2148; G06F 40/30
USPC .......................................................... 704/9
See application file for complete search history.

(56) References Cited

U.S. PATENT DOCUMENTS

| | | | | |
|---|---|---|---|---|
| 2007/0239430 A1* | 10/2007 | Ollason | ............... | G10L 15/1822 |
| | | | | 704/9 |
| 2020/0082204 A1* | 3/2020 | Beaver | .................. | G06F 40/253 |

FOREIGN PATENT DOCUMENTS

| | | | | | |
|---|---|---|---|---|---|
| CN | 102054015 A | * | 5/2011 | | |
| CN | 102236722 A | * | 11/2011 | | |
| CN | 110287461 A | * | 9/2019 | ............... | G06N 3/08 |
| CN | 112269874 A | * | 1/2021 | ............. | G06N 3/045 |
| CN | 112750465 A | * | 5/2021 | ............. | G10L 25/87 |
| CN | 112989055 A | * | 6/2021 | ........... | G06F 40/242 |
| CN | 113900665 A | * | 1/2022 | ............. | G06F 18/24 |
| CN | 114724667 A | * | 7/2022 | ........... | G06F 40/166 |
| CN | 120146036 A | * | 6/2025 | | |

* cited by examiner

*Primary Examiner* — Edwin S Leland, III

(74) *Attorney, Agent, or Firm* — Knobbe, Martens, Olson & Bear, LLP

(57) ABSTRACT

System and methods are provided that generate machine learned grammar rules. The system clusters a sample set of reviews. A human annotator manually generates grammar rules for the clustered sample set. Synthetic data is generated from the manually generated grammar rules and text. The system combines the sample set, the manually generated grammar rules, and the synthetic data. A grammar classifier is training using the training data. A grammar classifier receives input text and output a predicted grammar rule. The predicted grammar rule is used for natural language processing.

20 Claims, 8 Drawing Sheets

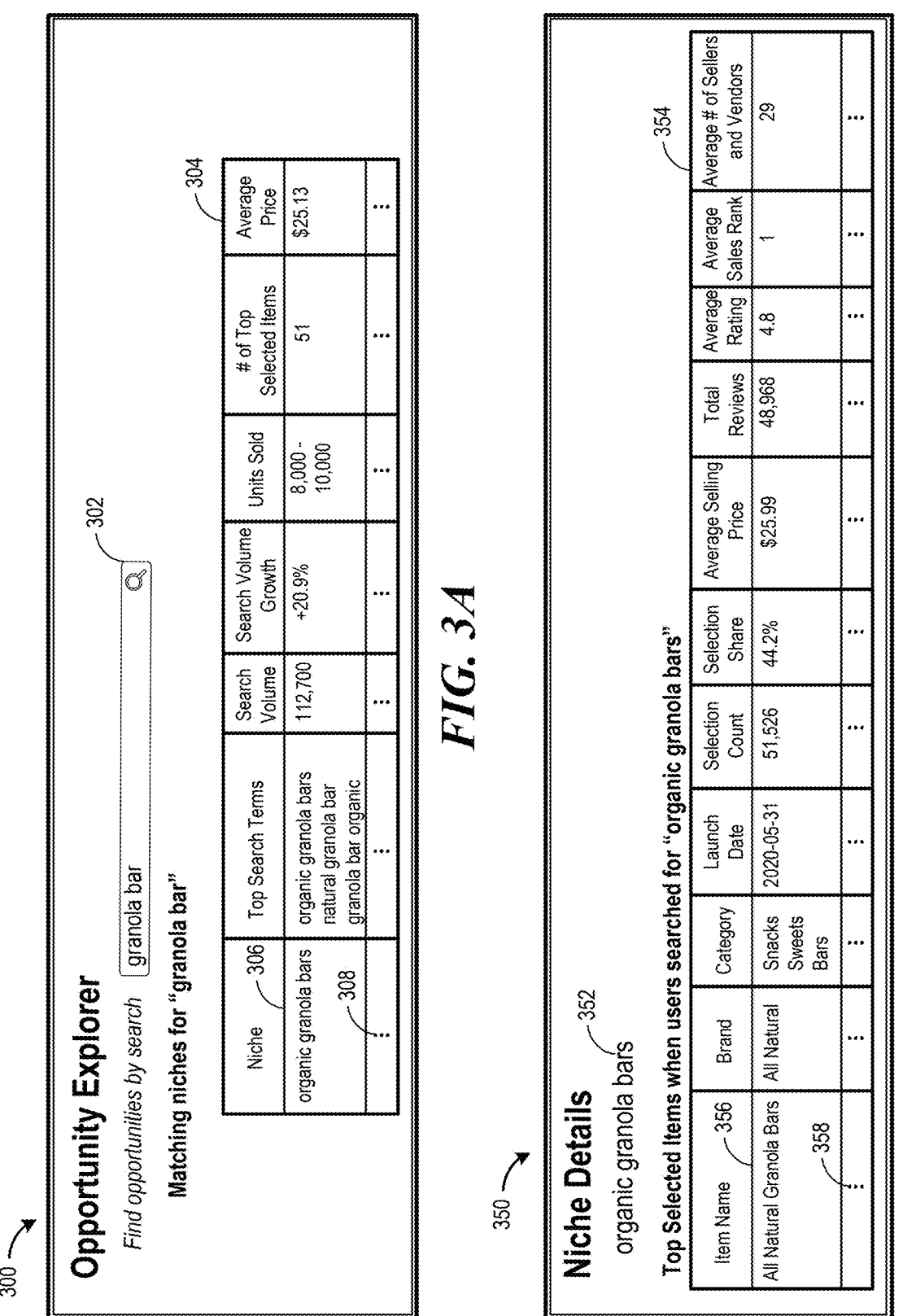

Opportunity Explorer

*Find opportunities by search*    granola bar

Matching niches for "granola bar"

| Niche | Top Search Terms | Search Volume | Search Volume Growth | Units Sold | # of Top Selected Items | Average Price |
|---|---|---|---|---|---|---|
| organic granola bars | organic granola bars<br>natural granola bar<br>granola bar organic | 112,700 | +20.9% | 8,000 - 10,000 | 51 | $25.13 |
| ... | ... | ... | ... | ... | ... | ... |

*FIG. 3A*

Niche Details organic granola bars

Top Selected Items when users searched for "organic granola bars"

| Item Name | Brand | Category | Launch Date | Selection Count | Selection Share | Average Selling Price | Total Reviews | Average Rating | Average Sales Rank | Average # of Sellers and Vendors |
|---|---|---|---|---|---|---|---|---|---|---|
| All Natural Granola Bars | All Natural | Snacks<br>Sweets<br>Bars | 2020-05-31 | 51,526 | 44.2% | $25.99 | 48,968 | 4.8 | 1 | 29 |
| ... | ... | ... | ... | ... | ... | ... | ... | ... | ... | ... |

*FIG. 3B*

Review Insights for Item: All Natural Granola Bars

Positive Review Snippets

| Topic | # Mentions | Review Snippet |
|---|---|---|
| Value For Money | 33 | "good deal," "great buy great price," "great deal" |
| Fresh | 17 | "very fresh," "super fresh" |
| Taste | 16 | "delicious," "taste good," "yummy" |
| Good Size | 10 | "great snack size," "good portion size" |
| Delivery | 6 | "arrived on time," "fast shipping" |
| Flavor | 5 | "good flavor," "natural flavor" |
| Good Customer Support | 1 | "fast service" |
| Original Authentic | 1 | "genuine product" |
| Quality | 1 | "quality is excellent" |
| Well Within Expiration | 1 | "good expiration" |

Negative Review Snippets

| Topic | # Mentions | Review Snippet |
|---|---|---|
| Stale | 19 | "not fresh," "bars stale," "was stale" |
| Expires Soon | 16 | "expiration date is," "close to expiration" |
| Product Expired | 15 | "out of date," "past the expiration date" |
| Package Damaged | 7 | "box damaged" |
| Incorrect Product Info | 4 | "not packaged as advertised," "misleading" |
| Taste | 3 | "bad flavor" |
| Arrived Damaged | 2 | "wrapper opened" |
| Small Size | 1 | "smaller than" |
| Not Durable | 1 | "close to the expiration date" |
| Burnt/Roasted | 1 | "were burnt" |

*FIG. 4*

MACHINE LEARNING GRAMMAR RULE GENERATION

BACKGROUND

In natural language processing, a computer can process human speech, such as text written by a human. Topic extraction models are capable of extracting topics (represented as a set of words) that occur in some text. Some of these existing models require extensive user input, such as, human definition of topics and human generated grammar rules for text-feature extraction. In an electronic catalog context, there can be millions of items in an electronic catalog. Users can submit reviews of those items, which can be stored as written text.

BRIEF DESCRIPTION OF THE DRAWINGS

These and other features, aspects and advantages are described below with reference to the drawings, which are intended for illustrative purposes and should in no way be interpreted as limiting the scope of the embodiments. Furthermore, various features of different disclosed embodiments can be combined to form additional embodiments, which are part of this disclosure. In the drawings, like reference characters can denote corresponding features throughout similar embodiments. The following is a brief description of each of the drawings.

FIGS. 3A-3B, 4, and 5 are pictorial diagrams illustrating graphical user interfaces provided by the natural language analysis system.

DETAILED DESCRIPTION

Figure 1:
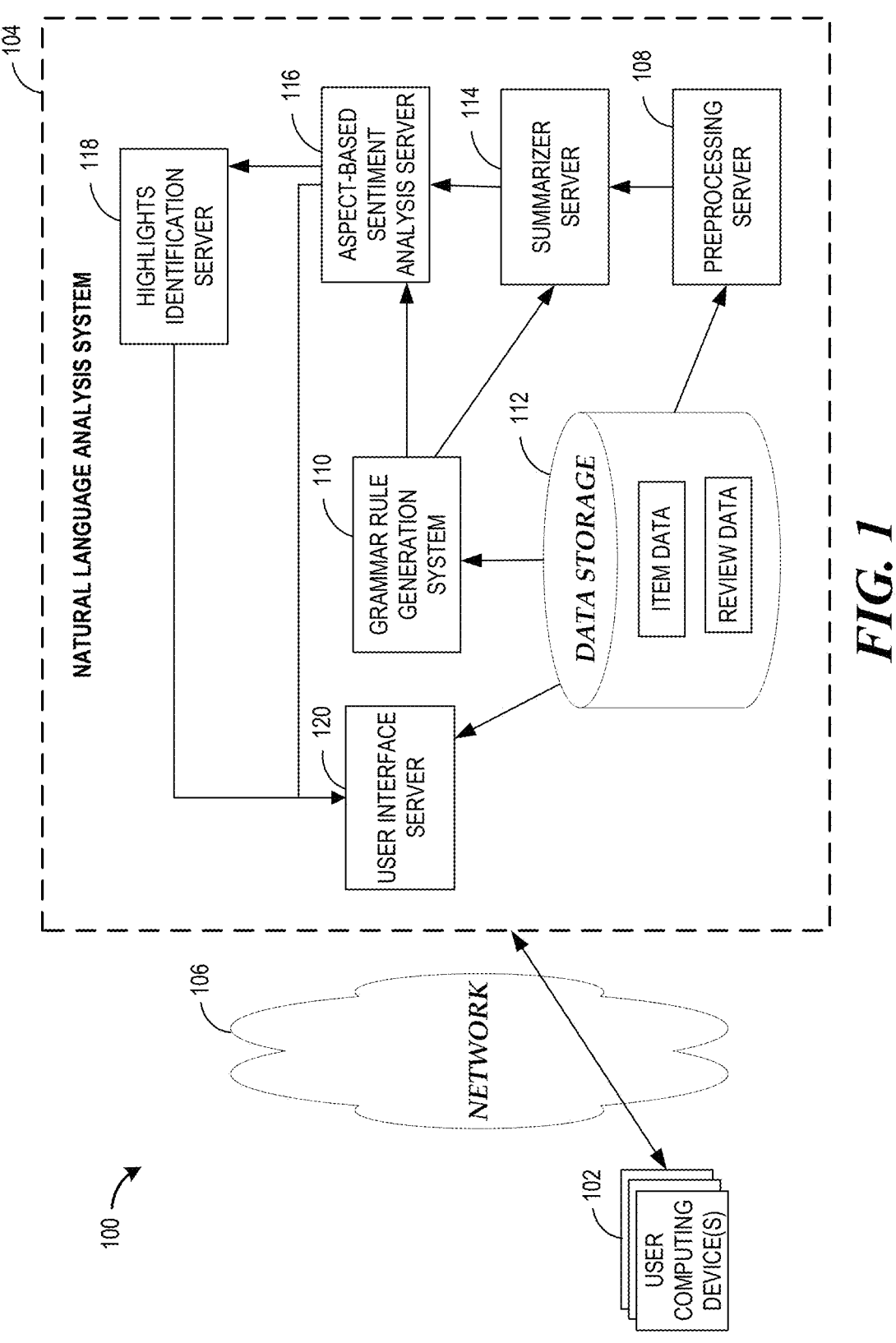
FIG. 1 is a schematic block diagram depicting an illustrative network environment for implementing a natural language analysis system.

As described above, existing topic extraction models are capable of extracting topics. Aspect-based sentiment analysis is a text analysis technique that categorizes data by aspect and identifies the sentiment attributed to each aspect. However, topic extraction and aspect-based sentiment analysis require extensive user input, such as, human generated grammar rules for text-feature extraction. Semi-automated topic extraction and aspect-based sentiment analysis can be helpful when applied to item reviews. However, the context of item reviews can especially present many technically challenging tasks, such as the data size, which can include millions of individual review texts for millions of items. Therefore, human generated grammar rules for natural language processing in the item review context can be impractical.

Generally described, aspects of the present disclosure are directed to machine learned grammar rule generation. As described herein, each item review can have an associated review rating. A grammar rule generation system can cluster a sample set of reviews based on a rating associated with each review. In some embodiments, the grammar rule generation system can cluster some reviews into three clusters, such as a first cluster of reviews associated with positive ratings, a second cluster of reviews associated with negative ratings, and a third cluster of reviews associated with neutral ratings. A human annotator can manually create grammar rules for each cluster. As described herein, initially creating separate grammars as the labels in the training data can advantageously improve the efficacy of the grammar classifier. The grammar rule generation system can further augment the training data by sequencing the review text used in the initial sample data. The grammar rule generation system can train a grammar classifier with the training data and the manually generated grammars as labels. The output grammar classifier can be configured to predict a grammar rule based on input text. A human annotator can review the predicted grammar rule and the corresponding input text in a graphical user interface. The human annotator can either approve the predicted grammar rule or generate another grammar rule if the grammar classifier misclassified the input text. The grammar rule generation system can re-train the classifier model with the feedback data. The grammar rules can be used by a natural language analysis system. The natural language analysis system can apply topic extraction and/or aspect-based sentiment analysis to review text to provide insights to items to entities.

As used herein, the term "item" can refer to a data object that can represent a specific thing that has a number of definable attributes. For example, an item can represent things such as, but not limited to, a physical product, a digital product, and/or an electronic document. The term "item" is used interchangeably to refer to an item itself (e.g., a particular product or particular digital content) and to its description or representation in a computer system or electronic catalog. As will be apparent from the context in which it is used, the term is also sometimes used herein to refer only to the item itself or only to its representation in the computer system. Example items can be music albums, audiobooks, books, movies, television shows, and/or other media products in either an electronic format or physical format. Example items can also be electronic or digital, such as an electronic service or any electronic content provided by a buyer to a seller in which a physical good is not transferred. Users can interact with items. For example, a user can select an item in a user interface to view details about the item. A user can acquire an item. A user can also consume an item, such as by watching a movie or listening to a music album.

In some embodiments, an electronic catalog system, as described herein, may include or be in communication with a data store of information about items that may be listed for sale, lease, etc. by an electronic marketplace, sellers, merchants and/or other users. The item information in this data store may be viewable by end users through a browsable or searchable electronic catalog in which each item may be described in association with a network page, such as an item detail page, describing the item. Each item detail page may include, for example, an item image and description, customer ratings, customer and professional reviews, sales rank data, lists of related items, and/or other types of supplemental data that may assist consumers in making informed purchase or acquisition decisions. A network page can be provided that enables users to interact with items, such as selecting, acquiring, or consuming items (such as watching or playing a media content item). Users of the system may, in some embodiments, locate specific item detail pages within the electronic catalog by executing search queries, navigating a browse tree, and/or using various other navigation techniques.

As used herein, the term "niche" can refer to a collection of search terms and/or items that represent a user need. In an electronic catalog system, users can demonstrate their needs based on the search queries and/or other user interactions with the system. Niches can be generated based on the user interaction data in an automated, semi-automated, and/or manually curated manner. In some embodiments, the electronic catalog system can identify the top items that were selected based on particular search terms (such as the top items that cumulatively received eighty percent of the selections for a particular search term.) A search term and/or item can be in multiple niches. Some niches can include, but are not limited to, "organic granola bars," "bulk potato chips," "cordless vacuum," etc. As described herein, in a graphical user interface, the niches and other associated data can be provided to entities that list items in the electronic catalog in order for the entities to discover potential opportunities to create and/or list new items in the catalog.

As used herein, the term "part of speech" can refer to a category of a word in accordance with its syntactic function. In some embodiments, parts of speech tags are provided below in Table 1. As described herein, the parts of speech tags can be used in a grammar rule. Depending on the embodiment, different parts of speech tags can be used.

TABLE 1

| Tag | Description |
|---|---|
| CC | Coordinating conjunction |
| CD | Cardinal digit/number |
| DT | Determiner |
| EX | Existential there |
| FW | Foreign word |
| IN | Preposition or subordinating conjunction |
| JJ | Adjective (e.g., "large") |
| JJR | Adjective, comparative (e.g., "larger") |
| JJS | Adjective, superlative (e.g., "largest") |
| LS | List item marker |
| MD | Modal (e.g., "could," "will") |
| NN | Noun, singular or mass ("cat," "tree") |
| NNS | Noun, plural (e.g., "desks") |
| NNP | Proper noun, singular phrase (e.g., "Sarah") |
| NNPS | Proper noun, plural (e.g., "Americans") |
| PDT | Predeterminer (e.g., "all," "both," "half") |
| POS | Possessive ending |
| PP | Preposition phrase |
| PRP | Personal pronoun (e.g., "hers," "herself," "him," "himself") |
| PRP$ | Possessive pronoun phrase (e.g., "her," "his," "mine," "my," "our") |
| RB | Adverb (e.g., "occasionally," "swiftly") |
| RBR | Adverb, comparative (e.g., "greater") |
| RBS | Adverb, superlative (e.g., "biggest") |
| RP | Particle (e.g., "about") |
| S | Simple declarative clause |
| SBAR | Clause introduced by a (possibly empty) subordinating conjunction |
| SBARQ | Direct question introduced by a wh-word or a wh-phrase |
| SINV | Inverted declarative sentence, i.e., one in which the subject follows the tensed verb or modal |
| SQ | Inverted yes/no question, or main clause of a wh-question, following the wh-phrase in SBARQ |
| SYM | Symbol |
| VBD | Verb, past tense (e.g., "pleaded") |
| VBG | Verb, gerund or present participle |
| VBN | Verb, past participle (e.g., "reunified") |
| VBP | Verb, present tense non-3rd person singular (e.g., "wrap") |
| VBZ | Verb, present tense with 3rd person singular (e.g., "bases") |
| VP | Verb phrase |
| WDT | Wh-determiner (e.g., "that," "what") |
| WP | Wh- pronoun (e.g., "who") |
| WRB | Wh- adverb (e.g., "how") |

As used herein, the term "grammar rule" can refer to instructions to parse sentences that can determine context and/or structure of words in the sentence. A grammar rule can follow a regular expression and/or the Natural Language Toolkit (NLTK) convention for representing rules, such as by using special characters shown in Table 2 below. Each grammar rule can represent a tree that represents a structure of the text. An example grammar rule can be the following: "<VBP|VB*>.*<JJ>|<JJ>". The < > characters in the grammar rule can represent a token. A grammar rule can be used for dependency parsing, which can be the process of analyzing the grammatical structure of one or more sentences based on the dependencies between the words in one or more sentences.

TABLE 2

| Special Character | Description |
|---|---|
| . | Any character except new line |
| * | Match 0 or more repetitions |
| ? | Match 0 or 1 repetitions |
| \| | Disjunction (e.g., x\|y matches either "x" or "y") |

As used herein, a "topic" can refer to a high-level category for a group of text (such as reviews). As used herein, an "aspect" can refer to the words in the text that lead to the user's sentiments. The "aspect" can also refer to the words in the text that describe features of an item and capture the user's sentiments, such as likes or dislikes.

Some existing natural language processing systems rely on exclusively human-generated grammar rules. In an electronic catalog system, niches can be generated based on a frequency, such as monthly. Each period (such as monthly), the electronic catalog system can generate tens of thousands unique niches, such as a hundred thousand, or potentially even more. Each niche can have a number of items, such as forty or fifty, which can be configurable, and a number of associated reviews, such as one thousand per period, for example. A human annotator may practically only be able to generate grammars for a particular niche based on one hundred reviews for that niche. However, as described herein, the human generated grammars may fail to identify the parts of speech and/or the interdependencies in the text, which may result in insufficient topic extraction and/or aspect-based sentiment analysis.

The systems and methods described herein may improve natural language processing technology. As described herein, machine learning can be used to largely automate the grammar rule generation process. The training data that is used for training a grammar classifier can be strategically clustered (such as positive, negative, and neutral clusters) to advantageously improve the classification of the grammar classifier. The grammar classifier can also be trained on much larger data sets that would be impractical for a human to review. Moreover, human reviewers can generate mean opinion scores for the humanly generated grammars and the grammars that are output by a grammar classifier, and the mean opinion scores for the machine learned grammars can be higher than the manually generated grammars. Therefore, the systems and methods described herein can improve over traditional natural language processing techniques.

Turning to FIG. 1, an illustrative network environment 100 is shown in which a natural language analysis system 104 may process and analyze text and provide the results of that analysis. The network environment 100 may include one or more user computing devices 102 and the natural language analysis 104. The natural language analysis 104 may include a user interface server 120, a grammar rule generation system 110, a preprocessing server 108, a summarizer server 114, an aspect-based sentiment analysis server 116, a highlights identification server 118, and a data storage 112. The constituents of the network environment 100 may be in communication with each other either locally or over a network 106. While certain constituents of the network environment 100 are depicted as being in communication with one another, any constituent of the network environment 100 can communicate with any other constituent of the network environment 100; however, not all of these communication lines are depicted in FIG. 1.

The grammar rule generation system 110 can generate grammar rules for the aspect-based sentiment analysis server 116. The grammar rule generation system 110 can receive review data and item data from the data storage 112. There can be a mapping of niches to items, which can be stored in the data storage 112. Some of the review data and item data can be used to train a grammar classifier of the grammar rule generation system 110. The grammar rule generation system 110 can use graphical user interfaces to receive feedback on the predicted grammar rules, which can be used to retrain the grammar classifier. In some embodiments, such a graphical user interface is described in further detail herein, such as with respect to FIG. 6. The grammar classifier can predict grammar rules and the grammar rule generation system 110 can provide the predicted grammar rules to the aspect-based sentiment analysis server 116.

The preprocessing server 108 can receive item data and review data from the data storage 112. In some embodiments, the preprocessing server 108 can also receive the mapping data of niches to items. The preprocessing server 108 can clean, normalize, and remove noise from the review text. The preprocessing server 108 can filter the reviews based on review metadata, such as ratings for those reviews, such as a helpful review rating. The summarizer server 114 can generate one or more review summaries for each niche. In some embodiments, the summarizer server 114 can use grammar rules from the grammar rule generation system 110. The summarizer server 114 can apply the grammar rules to determine context and/or dependencies between words in the review text. Thus, the summarizer server 114 can generate one or more review summaries for each niche based on an evaluation of the context of a review.

The aspect-based sentiment analysis server 116 can receive the review summaries from the summarizer server 114. The aspect-based sentiment analysis server 116 can determine aspects based on the review summaries. As described herein, a review can have both positive and negative aspects. The aspect-based sentiment analysis server 116 can weight the words to determine the most probable sentiment for the review. The highlights identification server 118 can analyze the aspects from the aspect-based sentiment analysis server 116 to determine topics from the reviews. Data from the aspect-based sentiment analysis server 116 and/or the highlights identification server 118 can be made available to users via the user interface server 120.

The user interface server 120 can provide graphical user interfaces to users. The data presented in the graphical user interfaces can, include, but are not limited to, niches, review text, review summaries, review highlights, item metadata, review metadata, aspects, topics, and/or predicted review sentiments. In some embodiments, those graphical user interfaces are described in further detail herein, such as with respect to FIGS. 3A-3B, 4, and 5. The user computing device 102 can access the graphical user interfaces provided by the user interface server 120. User computing devices

102 can include, but are not limited to, a laptop or tablet computer, personal computer, personal digital assistant (PDA), hybrid PDA/mobile phone, smart wearable device (such as a smart watch), mobile phone, and/or a smartphone.

The data storage 112 may be embodied in hard disk drives, solid state memories, any other type of non-transitory computer-readable storage medium. The data storage 112 may also be distributed or partitioned across multiple local and/or remote storage devices. The data storage 112 may include a data store. As used herein, a "data store" can refer to any data structure (and/or combinations of multiple data structures) for storing and/or organizing data, including, but not limited to, relational databases (e.g., Oracle databases, MySQL databases, etc.), non-relational databases (e.g., NoSQL databases, etc.), key-value databases, in-memory databases, tables in a database, and/or any other widely used or proprietary format for data storage.

The network 106 may be any wired network, wireless network, or combination thereof. In addition, the network 106 may be a personal area network, local area network, wide area network, cable network, satellite network, cellular telephone network, or combination thereof. In addition, the network 106 may be an over-the-air broadcast network (e.g., for radio or television) or a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long-Term Evolution (LTE) network, or any other type of wireless network. The network 106 can use protocols and components for communicating via the Internet or any of the other aforementioned types of networks, such as HTTP, TCP/IP, and/or UDP/IP.

The user computing devices 102, the natural language analysis system 104, and/or the grammar rule generation system 110 may each be embodied in a plurality of devices. Each of the user computing device 102, the natural language analysis system 104, and/or the grammar rule generation system 110 may include a network interface, memory, hardware processor, and non-transitory computer-readable medium drive, all of which may communicate with each other by way of a communication bus. The network interface may provide connectivity over the network 106 and/or other networks or computer systems. The hardware processor may communicate to and from memory containing program instructions that the hardware processor executes in order to operate the user computing devices 102, the natural language analysis system 104, and/or the grammar rule generation system 110. The memory generally includes RAM, ROM, and/or other persistent and/or auxiliary non-transitory computer-readable storage media.

Additionally, in some embodiments, the natural language analysis system 104 and/or the grammar rule generation system 110 or components thereof are implemented by one or more virtual machines implemented in a hosted computing environment. The hosted computing environment may include one or more rapidly provisioned and/or released computing resources. The computing resources may include hardware computing, networking and/or storage devices configured with specifically configured computer-executable instructions. A hosted computing environment may also be referred to as a "serverless," "cloud," or distributed computing environment.

Figure 2:
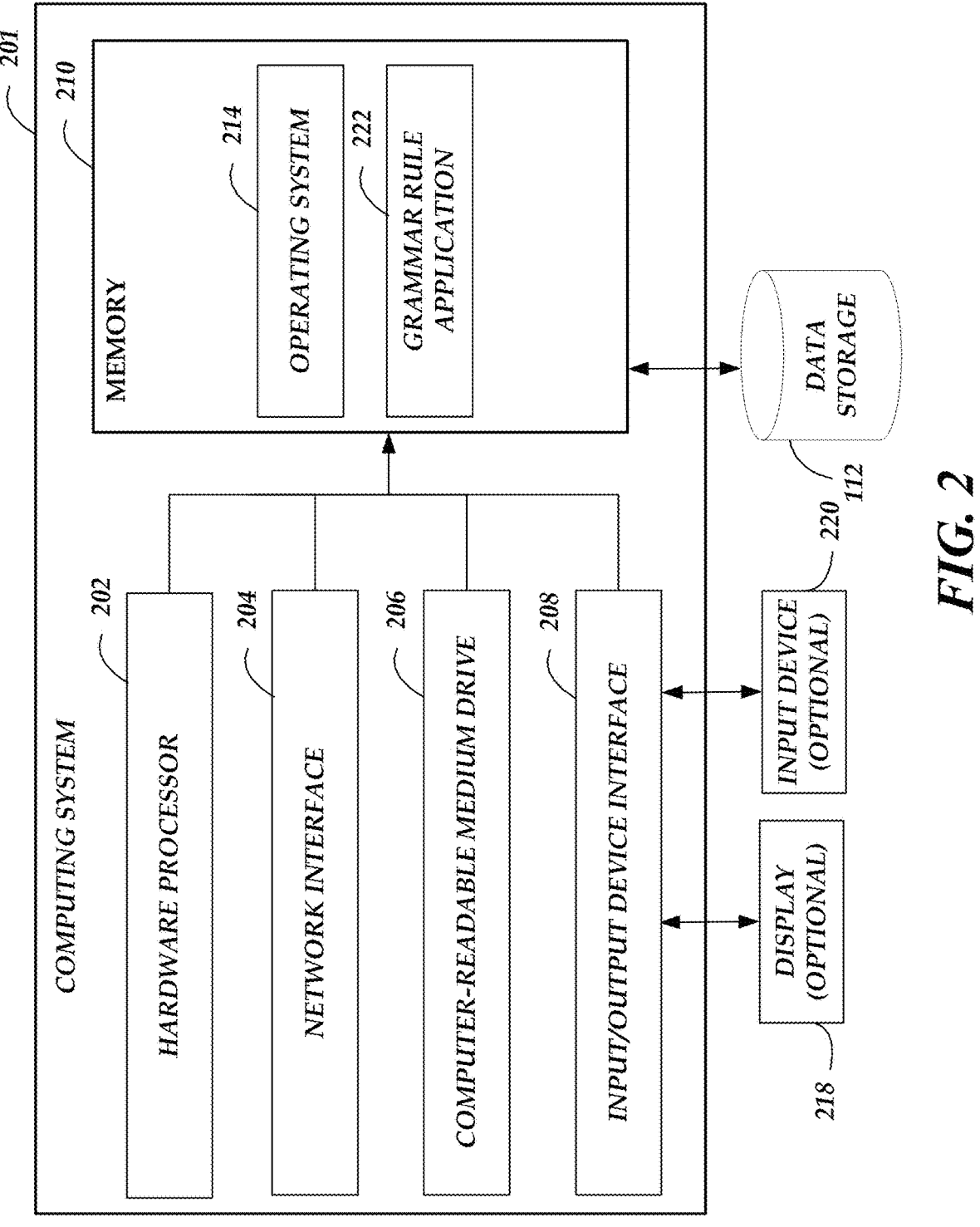
FIG. 2 is a schematic diagram depicting an illustrative general architecture of a computing system for implementing the grammar rule generation system referenced in the network environment depicted in FIG. 1.
Figure 7:
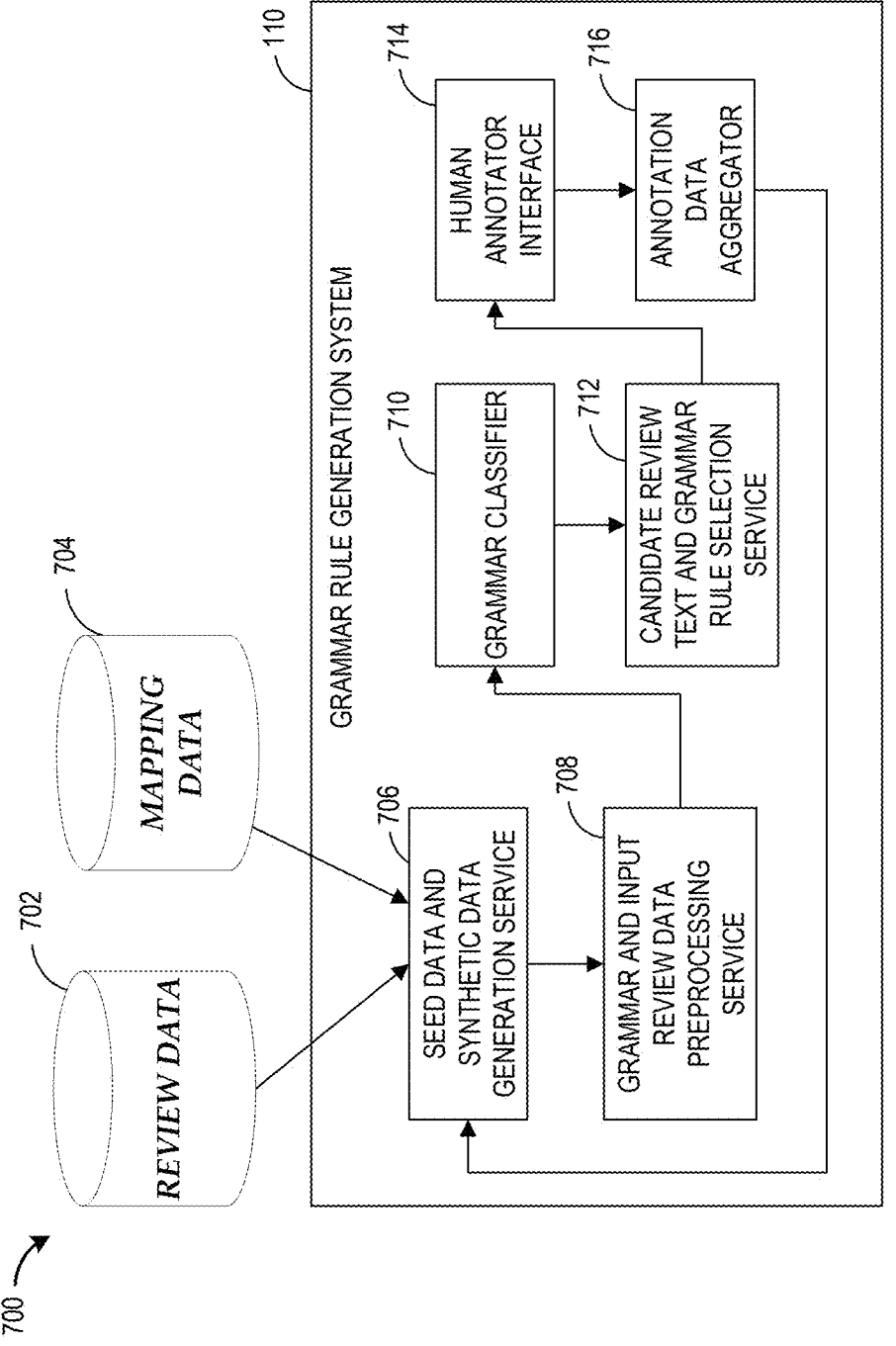
FIG. 7 is a schematic block diagram depicting a grammar rule generation system.

FIG. 2 is a schematic diagram of an illustrative general architecture of a computing system 201 for implementing a computing device within the natural language analysis system 104 and/or the grammar rule generation system 110 referenced in the environment 100, 700 in FIGS. 1 and 7. The computing system 201 includes an arrangement of computer hardware and software components that may be used to execute the grammar rule application 222. The general architecture of FIG. 2 can be used to implement other devices described herein, such as the user computing device 102 referenced in FIG. 1. The computing system 201 may include more (or fewer) components than those shown in FIG. 2. Further, other computing systems described herein may include similar implementation arrangements of computer hardware and/or software components.

The computing system 201 for implementing a device within the grammar rule generation system 110 may include a hardware processor 202, a network interface 204, a non-transitory computer-readable medium drive 206, and an input/output device interface 208, all of which may communicate with one another by way of a communication bus. As illustrated, the computing system 201 is associated with, or in communication with, an optional display 218 and an optional input device 220. The network interface 204 may provide the computing system 201 with connectivity to one or more networks or computing systems. The hardware processor 202 may thus receive information and instructions from other computing systems or services via the network 106. The hardware processor 202 may also communicate to and from memory 210 and further provide output information for an optional display 218 via the input/output device interface 208. The input/output device interface 208 may accept input from the optional input device 220, such as a keyboard, mouse, digital pen, and/or touch screen. The input/output device interface 208 may also output audio data to speakers or headphones (not shown).

The memory 210 may contain specifically configured computer program instructions that the hardware processor 202 executes in order to implement one or more embodiments of a device within the grammar rule generation system 110. The memory 210 generally includes RAM, ROM and/or other persistent or non-transitory computer-readable storage media. The memory 210 may store an operating system 214 that provides computer program instructions for use by the hardware processor 202 in the general administration and operation of the device within the grammar rule generation system 110.

The memory 210 may include a grammar rule application 222 that may be executed by the hardware processor 202. In some embodiments, the grammar rule application 222 may implement various aspects of the present disclosure. In some embodiments, the grammar rule application 222 can process the sample review data, generate the training data, train a grammar classifier, and/or retrain a grammar classifier. In some embodiments, the grammar classifier trained by the grammar rule application 222 can predict grammar rules, which can be used by the natural language analysis system 104.

FIG. 3A is a pictorial diagram illustrating a graphical user interface 300 of the natural language analysis system 104. The graphical user interface 300 can be an opportunity explorer that allows entities to search for niches to get insights for potential opportunities to improve or create new items. The graphical user interface 300 can include a search element 302. A user can submit user input via the graphical user interface 350. As depicted, the user can search for "granola bar" niches. The natural language analysis system 104 can provide the results of the search in the search results area 304. In some embodiments, the natural language analysis system 104 can provide the niche search results in a table format in the search results area 304. A first niche search result 306 is depicted for an "organic granola bars" niche. As depicted, data associated with the niche search results can be provided in the search results area 304, such as, but not limited to, niche name, top search terms associated with the niche, and/or niche metrics. In some embodiments, niche metrics can include, but are not limited to, search volume, search volume growth, units sold, number of top selected items, and/or average price for the niche. Additionally or alternatively, while not shown in FIG. 3A, niche metrics can be provided for different time periods where applicable, such as, but not limited to, search volume for the past 360 days and/or 90 days, search volume growth for the past 360 days and/or 90 days, etc. The ellipsis 308 represents that multiple niche search results can be shown in the search results area 304. In some embodiments, a user can select the first niche search result 306 and the natural language analysis system 104 can present another graphical user interface with details associated with the corresponding niche.

FIG. 3B is a pictorial diagram illustrating another graphical user interface 350 of the natural language analysis system 104. The natural language analysis system 104 can present the graphical user interface 350 in response to a user selection of an element corresponding to a niche, such as the first niche search result 306 described above with respect to FIG. 3A. The graphical user interface 350 can allow an entity to get insights for potential opportunities. The graphical user interface 350 can provide details for the particular niche 352 (here "organic granola bars"). The natural language analysis system 104 can provide the constituent details of the niche in the items area 354. In some embodiments, the natural language analysis system 104 can provide the item details in a table format in the items area 354. A first item element 306 is depicted for an "All Natural Granola Bars" item. As depicted, data associated with the items can be provided in the items area 354, such as, but not limited to, item name, brand, one or more categories, launch date, selection count, selection share, average selling price, total number of reviews, average item rating, average sales rank, and/or average number of sellers or vendors. In other embodiments, different metrics can be provided for each item. The ellipsis 358 represents that multiple items can be shown in the items area 354. In some embodiments, a user can select the first item element 356 and the natural language analysis system 104 can present another graphical user interface with details associated with the corresponding item.

FIG. 4 is a pictorial diagram illustrating yet another graphical user interface 400 of the natural language analysis system 104. The natural language analysis system 104 can present the graphical user interface 400 in response to a user selection of an element corresponding to an item, such as the first item element 356 described above with respect to FIG. 3B. The graphical user interface 400 can allow an entity to get insights for potential opportunities related to an item. The graphical user interface 400 can provide summary data for the particular item 402 (here "All Natural Granola Bars"). The natural language analysis system 104 can provide review metadata for the item 402 in the review areas 404, 406. As described herein, the natural language analysis system 104 can use the grammar rules from the grammar rules generation system 110 to identify the review metadata presented in the review areas 404, 406.

An example review of the item 402 (here "All Natural Granola Bars") can be the following text: "Our daughter is severely allergic to peanuts/tree nuts. We love granola bars, and since her diagnosis, it's been hard to find things that are safe and taste good! I actually really love these and have one every morning with my coffee. It's like a little brownie with chocolate chips inside, it's not super soft but more crispy, and I like it!" An existing topic extraction model may tag the foregoing review with an "Allergy" topic because of the presence of the phrase "severely allergic to peanuts/tree nuts." However, the natural language analysis system 104 can, using a grammar rule from the grammar rules generation system 110, can determine the context and dependencies between that phrase and the subsequent phrase "safe and taste good." The natural language analysis system 104 can, using a generated grammar rule, identify and extract the "Taste" topic from the review text by scanning the part of speech tags and determine the "Taste" topic is a positive topic from the determined context and dependencies. Similarly, the natural language analysis system 104 may not, using the generated grammar rule, associate the foregoing review with a negative "Allergy" topic from the determined context and dependencies.

In some embodiments, the natural language analysis system 104 can provide review metadata in a table format in the review areas 404, 406. In the first review area 404, review metadata, such as, but not limited to, topics, number of mentions, and review snippets can be provided for review text that have positive topic reviews for the item 402. In the first review area, the identified review metadata 408 can include the topic "Taste" and review snippet "taste good" that the natural language analysis system 104 identified from the review text: "Our daughter is severely allergic to peanuts/tree nuts. We love granola bars, and since her diagnosis, it's been hard to find things that are safe and taste good! I actually really love these and have one every morning with my coffee. It's like a little brownie with chocolate chips inside, it's not super soft but more crispy, and I like it!" In the second review area 406, review metadata, such as, but not limited to, topics, number of mentions, and review snippets can be provided for review text that have negative topic reviews for the item 402. In other embodiments, while not shown, some graphical user interfaces for items can present summary visualizations, such as graphs or charts that depict the impact of topics on an item's rating. In such a visualization, the y-axis can be the different topics, either positive or negative, and the x-axis can be a numerical value for an item rating.

Figure 5:
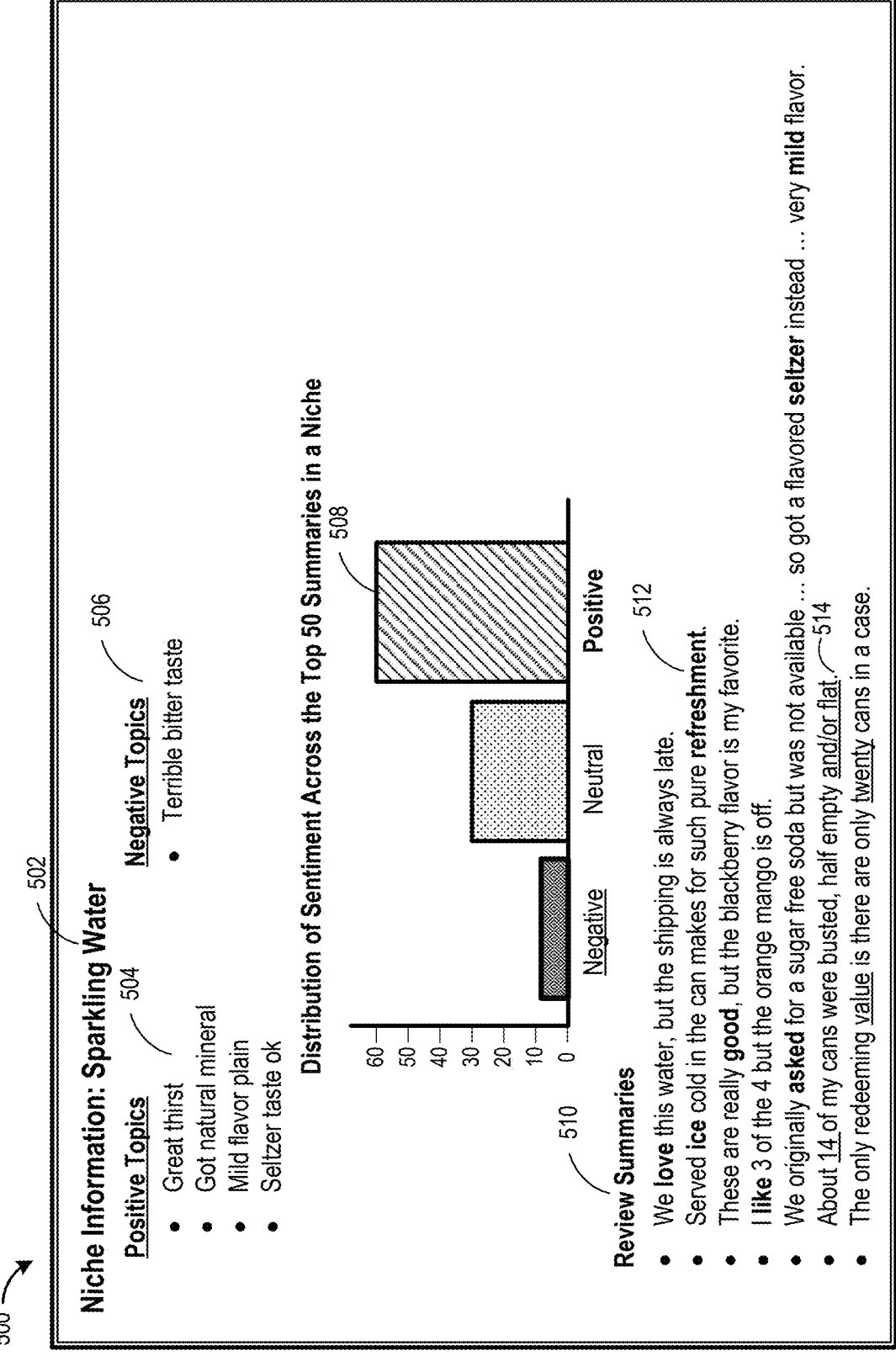

FIG. 5 is a pictorial diagram illustrating yet another graphical user interface 500 of the natural language analysis system 104. The natural language analysis system 104 can present the graphical user interface 500 in response to a user selection of an element corresponding to a niche. The graphical user interface 500 can allow an entity to get insights for potential opportunities related to a niche. The graphical user interface 500 can provide summary for the particular niche 502 (here "Sparking Water"). The natural language analysis system 104 can provide review metadata for the niche. That graphical user interface can include topic areas 504, 506, a visualization area 508, and/or a review summary area 510 review text annotated with aspect-based sentiment results. As described herein, the natural language analysis system 104 can use the grammar rules from the grammar rules generation system 110 to identify the review metadata presented in the metadata areas 504, 506, 508, 510.

The natural language analysis system 104 can automatically generate and extract topics from the review text. The natural language analysis system 104 can present the positive and negative topics in the topic areas 504, 506. The natural language analysis system 104, after performing aspect-based sentiment analysis, can present the results of aspect-based sentiment analysis in the visualization area 508. As depicted, the visualization area 508 can present the distribution of sentiment across the top summaries (such as top fifty summaries) in a niche. The natural language analysis system 104, again after performing aspect-based sentiment analysis on review summary data, can present the results of aspect-based sentiment analysis in the review summary area 510. As depicted, the review summary area 510 can include review summaries that are annotated to show the aspects that provide a particular sentiment. The natural language analysis system 104 can annotate a first review summary 512 to depict that "ice" and "refreshment" are the aspects in the summary 512 that predicted to provide a positive sentiment by the system 104. The natural language analysis system 104 can annotate a second review summary 514 to depict that "14" and "and/or flat" are the aspects in the summary 514 that are predicted to provide a negative sentiment by the system 104.

Figure 6:
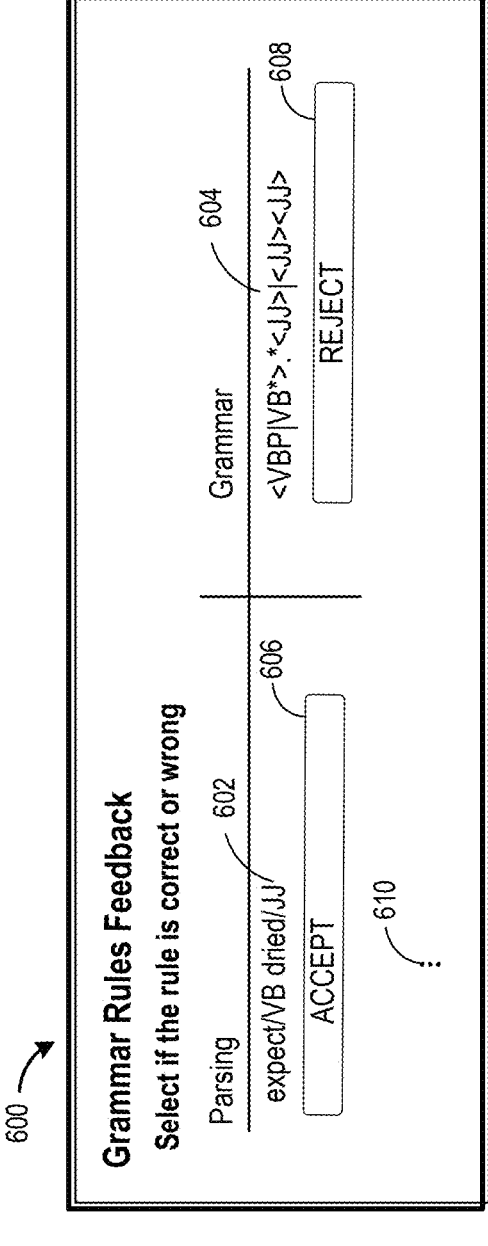
FIG. 6 is a pictorial diagram illustrating a graphical user interface for receiving grammar rules feedback as part of a machine learning grammar rules generation process.

FIG. 6 is a pictorial diagram illustrating a graphical user interface 600 of the grammar rule generation system 110. As described herein, a human annotator can use the graphical user interface 600 to review and provide feedback on the predicted grammars from the grammar rule generation system 110. The graphical user interface 600 includes a first parsed review text 602 (here the parsed review text is "expect/VB dried/JJ") and a first predicted grammar rule 604 (here the predicted grammar rule is "<VBP|VB*>.*<JJ>|<JJ><JJ>"). If the human annotator believes the first predicted grammar rule 604 is correct for the first parsed review text 602, then the human annotator can select the accept element 606. Conversely, if the human annotator believes the first predicted grammar rule 604 is incorrect for the first parsed review text 602, then the human annotator can select the reject element 606. In some embodiments, while not shown, if the human annotator believes the first predicted grammar rule 604 is incorrect and select the reject element 606, then grammar rule generation system 110 can present an additional element or user interface to receive a corrected gramma rule from the human annotator. The ellipsis 610 can represent that additional parsed review text and grammar rule pairs can be presented to a human annotator for additional review to either accept or reject the predicted grammar rules. As described herein, the grammar rule generation system 110 can use the feedback data (such as the corrected labels and corresponding review text) to retrain a grammar classifier in the grammar rule generation system 110.

FIG. 7 is a schematic block diagram depicting a grammar rule generation system 110. The environment 700 may include review data 702, mapping data 704, and the grammar rule generation system 110. The grammar rule generation system 110 can include a seed data and synthetic data generation service 706, a grammar and input review data preprocessing service 708, a grammar classifier 710, a candidate review text and grammar rule selection service 712, a human annotator interface 714, and an annotation data aggregator 716. While certain constituents of the environment 700 are depicted as being in communication with one another, any constituent of the environment 700 can communicate with any other constituent of the environment 700; however, not all of these communication lines are depicted in FIG. 7.

The seed data and synthetic data generation service 706 can receive review data 702 and mapping data 704. The mapping data 704 can include mappings from niches to items. The seed data and synthetic data generation service 706 can use the mapping data 704 to group reviews from the review data 702 by niche. In some embodiments, the seed data and synthetic data generation service 706 can cluster some reviews into three clusters, such as a first cluster of reviews associated with positive ratings, a second cluster of reviews associated with negative ratings, and a third cluster of reviews associated with neutral ratings. The seed data and synthetic data generation service 706 can normalize the review ratings. In some embodiments, the seed data and synthetic data generation service 706 can assign reviews with ratings between one and two as being negative, reviews with ratings between two and three as being neutral, and reviews with ratings between four and five as being positive. Clustering the reviews can be advantageous because the semantic structure and syntactic details for the reviews in each cluster can be similar. The reviews in the clusters can be for a particular niche. A human annotator can manually create grammar rules for each cluster. The human annotator can manually create approximately a set of one hundred grammar rules for each cluster.

Following the seed data annotation, the seed data and synthetic data generation service 706 can apply a synthetic data generation technique to create representative and/or balanced samples for the training process. A synthetic data generator can parse each review and the grammar rules to augment the seed data that results in the training data. The synthetic data generator can use a configurable window length to extract the neighboring phrases from the review text, and their corresponding grammar is extracted to create the labels for the training data. For example, if the word length of the review text is twenty, then the grammar length for the corresponding review can also be twenty, as every word can be associated with a part-of-speech tag. The window length can be five. The synthetic data generator can iteratively select the phrases of word length five from the review text with the parts of the grammar rules of length five from the predefined grammar rule label for that text. The data generated from the synthetic data generator is added to the training data.

Generation of the synthetic can generally be defined by the following equation: $IN=((LR-W)/S)+1$. In the question, IN can be the input data length, LR can be the word length of the review text, W can be the window size, and S can be the stride size. For example, for the review text "I am very picky about my cases," which has a review length seven, with a window size of two, the below Table 3 can illustrate example sequences based on different stride sizes.

TABLE 3

| Example Input Sequence 1 | Example Input Sequence 2 |
|---|---|
| Stride: 1 | Stride: 2 |
| Input data length: | Input data length: |
| ((7 − 2)/1) + 1 = 6 | ((7 − 2)/2) + 1 = 4 (rounded up) |
| Input sequences: | Input sequences: |
| 1. I am | 1. I am |
| 2. am very | 2. very picky |
| 3. very picky | 3. about my |
| 4. picky about | 4. cases <EOS> |
| 5. about my | |
| 6. my cases <EOS> | |

The grammar and input review data preprocessing service 708 can clean, normalize, and remove noise from the training data. The grammar classifier 710 can be trained using the training data that includes the grammar rule labels. In some embodiments, the grammar classifier 710 can be a transformed-based classifier, such as a Bidirectional Encoder Representations from Transformer (BERT) classifier. In some embodiments, BERT can be a transformer language model with a variable number of encoder layers and self-attention heads. In some embodiments, the input data (such as review text) is converted to a vector and the vector is passed to the transformed-based classifier 710 to predict the grammars. In some embodiments, the grammar classifier 710 can output multiple grammar rules, each with a different predicted likelihood.

The candidate review text and grammar rule selection service 712 can process the output from the grammar classifier 710. In some embodiments, the candidate review text and grammar rule selection service 712 can apply a threshold to the probabilities (such as a softmax score) for each predicted grammar rule and select the candidate review phrases and grammar rules that are above the threshold value. The human annotator interface 714 can receive the candidate phrases and the generated grammar rules. The human annotator interface 714 can present a graphical user interface, such as the graphical user interface 600 described above with respect to FIG. 6, to receive feedback on the parsed review text and corresponding grammar rule. If a human annotator determines that a grammar rule is incorrect for a corresponding review text, the human annotator interface 714 can receive a corrected grammar rule. The annotation data aggregator 716 can receive the corrected grammar rule and make available the rule and corresponding review text to the seed data and synthetic data generation service 706 to begin the retraining process of the grammar classifier 710.

Figure 8:
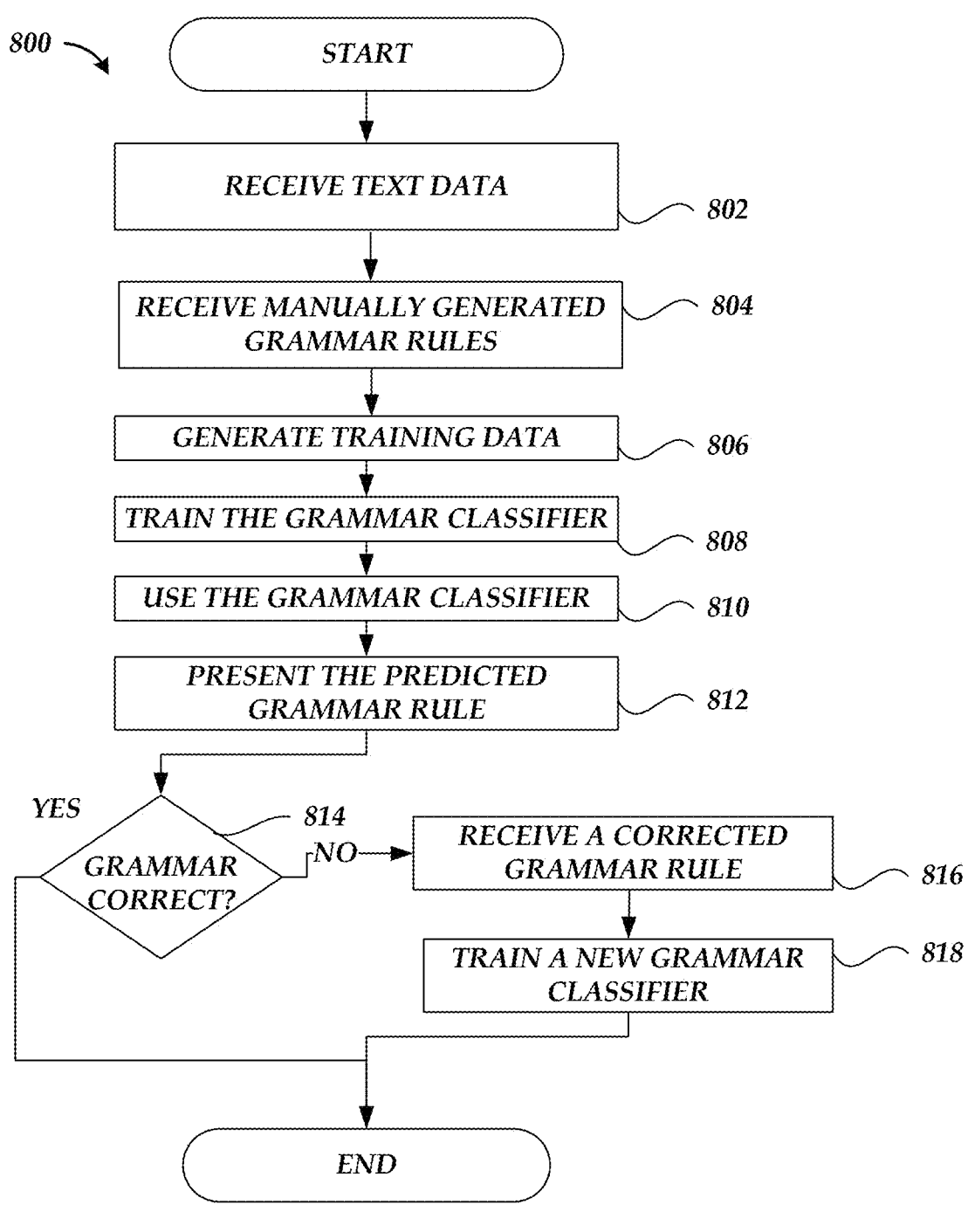
FIG. 8 is a flow chart depicting a method for machine learned grammar rule generation.

FIG. 8 is a flow diagram depicting an example method 800 implemented by the grammar rule generation system 110 and/or the natural language analysis system 104 for machine learned grammar rule generation. As described herein, the grammar rule generation system 110 may be implemented with the computing system 201. In some embodiments, the computing system 201 may include the grammar rule application 222 and may implement aspects of the method 800. Some aspects of the method 800 may be implemented by other components of the grammar rule generation system 110, such as the seed data and synthetic data generation service 706, the grammar and input review data preprocessing service 708, the grammar classifier 710, a candidate review text and grammar rule selection service 712, the human annotator interface 714, and/or the annotation data aggregator 716. Some aspects of the method 800 may be implemented by other components of the natural language analysis system 104, such as the user interface 120, the summarizer service 114, the aspect-based sentiment analysis server 116, and/or the highlights identification server 118. Moreover, some aspects of the method 800 may be described above with respect to FIGS. 1 and 7.

Beginning at block 802, text data can be received. The seed data and synthetic data generation service 706 can receive text entries, such as the review data 702. Each text entry can be associated with an item. In some embodiments, the seed data and synthetic data generation service 706 can receive mapping data 704 that maps items to niches. The seed data and synthetic data generation service 706 can group, from the text entries, a first cluster of text entries associated with a first rating, and a second cluster of text entries associated with a second rating. The service 706 can cluster the text entries based on ratings associated with each entry, such as those entries that have a rating value between different range values and/or above or below a threshold value. In some embodiments, the seed data and synthetic data generation service 706 can group, from a collection of review texts, a first cluster of review texts associated with a positive rating, a second cluster of review texts associated with a negative rating, and a third cluster of review texts associated with a neutral rating. The service 706 can cluster the review texts as positive if the review texts have a rating value above a threshold value, neutral if the review texts have a rating value within two threshold values, and negative if the review texts have a rating value below a threshold value. As described herein, clustering the text entries can be advantageous because the semantic structure and syntactic details for the text entries in each cluster can be similar, which can improve the generated grammar rules because the training data and associated labels can be segregated and customized for the clusters. As described herein, the improved grammar rules can better detect context and dependencies in the text entries.

At block 804, manually generated grammar rules can be received. The seed data and synthetic data generation service 706 can receive a first set of manually generated grammar rules for each text entry from the first cluster of text entries, and a second set of manually generated grammar rules for each text entry from the second cluster of text entries. In some embodiments, the service 706 can receive a first set of manually generated grammar rules for each review text from the first cluster of review texts, a second set of manually generated grammar rules for each review text from the second cluster of review texts, and a third set of manually generated grammar rules for each review text from the third cluster of review texts. As described herein, the grammar rule can include the parts of speech in a regular expression format. The distinct grammar rules for each cluster can reflect the semantic structure and syntactic details for the text entries in each cluster.

At block 806, training data can be generated. In some embodiments, the seed data and synthetic data generation service 706 can add the first cluster of text entries, the first set of manually generated grammar rules, the second cluster of text entries, and the second set of manually generated grammar rules to the training data. In other embodiments, the service 706 can add the first cluster of review texts, the first set of manually generated grammar rules, the second cluster of review texts, the second set of manually generated grammar rules, the third cluster of review texts, and the third set of manually generated grammar rules to the training data. In some embodiments, the service 706 can generate synthetic data and add it to the training data. The service 706 can split a text entry (such as a review text) and its manually generated grammar rule into a first subsequence of the text entry and a second subsequence of the manually generated grammar rule. The service 706 can break up the text entry (such as the review text) into shorter phrases and identify the parts of speech from the manually generated grammar rule that match the shorter phrases. Additional details regarding synthetic data generation and subsequences are described in further detail herein, such as with respect to FIG. 7 and Table 3.

At block 808, the grammar classifier 710 can be trained. The grammar rule application 222 can train the grammar classifier 710 with the training data, which can include the grammar rule labels and the synthetic data. The grammar rule application 222 can use the manually generated grammar rules as labels during training. In some embodiments, the grammar rule application 222 can train a transformed-based classifier, such as a BERT classifier. Depending on the embodiment, the grammar rule application 222 can train different grammar classifiers 710 such as, but not limited to, a Robustly Optimized BERT Pretraining Approach (RO-BERTa) model or a DistilBERT model. The grammar classifier 710 can be configured to predict a grammar rule based on input text. In some embodiments, the grammar classifier 710 can output multiple grammar rules based on the same input text, and each grammar rule can be associated with an output score. In some embodiments, the candidate review text and grammar rule selection service 712 can select the one or more grammar rules based on the output score for each predicted grammar rule. The candidate review text and grammar rule selection service 712 can apply a softmax function to the output scores for the predicted grammar rules and output of the softmax function can be the scores converted to probabilities. The service 712 can select, from the probabilities, the one or more grammar rules with a probability above a threshold value.

At block 810, a grammar classifier can be used. In some embodiments, the natural language analysis system 104 can use the grammar classifier to predict grammar rules, which can be used for opportunity exploring and gaining insights. The natural language analysis system 104 can load the grammar classifier. The natural language analysis system 104 can apply the grammar classifier to a first text entry (such as review text) and output of the grammar classifier comprises a predicted grammar rule for the first text entry. The natural language analysis system 104 can extract, from a second text entry (such as second review text), a topic using the predicted grammar rule. The natural language analysis system 104 can cause presentation, in a graphical user interface, of at least a portion the second text entry, an item associated with the second text entry, and the topic. Additionally or alternatively, the natural language analysis system 104 can extract, from a second text entry (such as second review text), an aspect and a sentiment using the predicted grammar rule. The natural language analysis system 104 can cause presentation, in a graphical user interface, of at least a portion of the second text entry, the aspect, and the sentiment. The natural language analysis system 104 can group a collection of items into a niche based on a common search term for at least some of the items from the collection of items. The clusters of text entries (such as text reviews) can be associated with an item from the niche. Additional details regarding graphical user interfaces are described in further detail herein, such as with respect to FIGS. 4 and 5. In some embodiments, the grammar rule generation system 110 can use the grammar classifier to predict grammar rules and use semi-supervised machine learning to train a new grammar classifier. The grammar rule generation system 110 can apply the grammar classifier to input text and output of the grammar classifier can include a predicted grammar rule for the input text.

At block 812, a predicted grammar rule can be presented. In some embodiments, the human annotator interface 714 can cause presentation, in a graphical user interface, of the input text and the predicted grammar rule. Additional details regarding a graphical user interface for presenting a grammar rule is described herein, such as with respect to FIG. 6. At block 814, it can be determined whether the predicted grammar rule is correct. A human annotator can review the input text and the predicted grammar rule and make a determination whether the predicted grammar rule is correct or not. If the grammar rule is correct, then the method 800 can end. Otherwise, if the grammar rule is incorrect, the method 800 can proceed to block 816 to receive a corrected grammar rule.

At block 816, a corrected grammar rule can be received. The human annotator interface 714 can receive, via the graphical user interface, a corrected grammar rule for the input text. At block 818, a new grammar classifier can be trained. The grammar rule generation system 110 can generate updated training data that includes the input text and the corrected grammar rule. The grammar rule generation system 110 can train a new grammar classifier using the updated training data. In some embodiments, training a new grammar classifier can include retraining an existing grammar classifier. The grammar rule generation system 110 can use the updated training data to adjust the weights in the existing grammar classifier.

While some of the solutions and techniques described herein address natural language processing and grammar rule generation in a review context, in other embodiments those same solutions and techniques can be applied to any other context that involves text entries that are not reviews.

Not necessarily all objects or advantages may be achieved in accordance with any particular embodiment described herein. Thus, certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can." "could." "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The terms "comprising." "including." "having." and the like are synonymous and are used inclusively, in an open-ended fashion, and do not exclude additional elements, features, acts, operations, and so forth. Further, the term "each", as used herein, in addition to having its ordinary meaning, can mean any subset of a set of elements to which the term "each" is applied. The term "substantially" when used in conjunction with the term "real time" can refer to speeds in which no or little delay occurs.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for machine learning generation of grammars, the computer-implemented method comprising:

grouping, from a plurality of review texts, a first cluster of review texts associated with a positive rating, a second cluster of review texts associated with a negative rating, and a third cluster of review texts associated with a neutral rating;

receiving a first set of manually generated grammar rules for each review text from the first cluster of review texts, a second set of manually generated grammar rules for each review text from the second cluster of review texts, and a third set of manually generated grammar rules for each review text from the third cluster of review texts;

generating training data from the first cluster of review texts,
    the first set of manually generated grammar rules,
    the second cluster of review texts,
    the second set of manually generated grammar rules,
    the third cluster of review texts, and
    the third set of manually generated grammar rules,
        wherein generating the training data further comprises:
            splitting a review text and its manually generated grammar rule into a first subsequence of the review text and a second subsequence of the manually generated grammar rule; and
training a grammar classifier using the training data, wherein the manually generated grammar rules are used as labels during training, and wherein the grammar classifier is configured to predict a grammar rule based on input text.

2. The computer-implemented method of claim 1, further comprising:

applying the grammar classifier to input text, wherein output of the grammar classifier comprises a predicted grammar rule for the input text; and causing presentation, in a graphical user interface, of the input text and the predicted grammar rule.

3. The computer-implemented method of claim 2, further comprising:

receiving, via the graphical user interface, a corrected grammar rule for the input text;

generating updated training data comprising the input text and the corrected grammar rule; and training a new grammar classifier using the updated training data.

4. The computer-implemented method of claim 1, wherein grouping the first cluster of review texts associated with the positive rating further comprises:

identifying, from the plurality of review texts, a first review text associated with a rating value above a threshold value.

5. The computer-implemented method of claim 1, wherein splitting the review text and its manually generated grammar rule into subsequences further comprises:

breaking up the review text into shorter phrases; and identifying parts of speech from the manually generated grammar rule matching the shorter phrases.

6. The computer-implemented method of claim 1, wherein the grammar classifier comprises a bidirectional encoder representations from transformer classifier.

7. A system comprising:

a data storage medium; and one or more computer hardware processors in communication with the data storage medium, wherein the one or more computer hardware processors are configured to execute computer-executable instructions to at least:

group, from a plurality of review texts, a first cluster of review texts associated with a first rating, and a second cluster of review texts associated with a second rating;

receive a first set of manually generated grammar rules for each review text from the first cluster of review texts, and a second set of manually generated grammar rules for each review text from the second cluster of review texts;

generate training data from the first cluster of review texts,
    the first set of manually generated grammar rules,
    the second cluster of review texts, and
    the second set of manually generated grammar rules,
        wherein generating the training data further comprises:
            splitting a review text and its manually generated grammar rule into a first subsequence of the review text and a second subsequence of the manually generated grammar rule; and
train a grammar classifier with the training data, wherein the manually generated grammar rules are used as labels during training, and wherein the grammar classifier is configured to predict a grammar rule based on input text.

8. The system of claim 7, wherein the one or more computer hardware processors are configured to execute further computer-executable instructions to at least:

apply the grammar classifier to first review text, wherein output of the grammar classifier comprises a predicted grammar rule for the first review text;

extract, from second review text, a topic using the predicted grammar rule; and cause presentation, in a graphical user interface, of at least a portion the second review text, an item associated with the second review text, and the topic.

9. The system of claim 7, wherein the one or more computer hardware processors are configured to execute further computer-executable instructions to at least:

apply the grammar classifier to first review text, wherein output of the grammar classifier comprises a predicted grammar rule for the first review text;

extract, from second review text, an aspect and a sentiment using the predicted grammar rule; and cause presentation, in a graphical user interface, of at least a portion of the second review text, the aspect, and the sentiment.

10. The system of claim 9, wherein the one or more computer hardware processors are configured to execute additional computer-executable instructions to at least:

group a collection of items into a niche based on a common search term for at least some of items from the collection of items, wherein the first cluster of review texts and the second cluster of review texts are associated with an item from the niche; and cause presentation, in the graphical user interface, of the niche.

11. The system of claim 7, wherein the one or more computer hardware processors are configured to execute further computer-executable instructions to at least:

apply the grammar classifier to first review text, wherein output of the grammar classifier comprises a plurality of predicted grammar rules for the first review text, and an output score for each predicted grammar rule from the plurality of predicted grammar rules; and select one or more grammar rules from the plurality of predicted grammar rules based on the output score for each predicted grammar rule.

12. The system of claim 11, wherein selecting the one or more grammar rules from the plurality of predicted grammar rules further comprises:

applying a softmax function to the output scores for the plurality of predicted grammar rules, wherein output of the softmax function comprises a plurality of probabilities; and selecting, from the plurality of probabilities, the one or more grammar rules with a probability above a threshold value.

13. The system of claim 7, wherein the grammar rule comprises a plurality of parts of speech in a regular expression format.

14. A system comprising:

a data storage medium; and one or more computer hardware processors in communication with the data storage medium, wherein the one or more computer hardware processors are configured to execute computer-executable instructions to at least:

group, from a plurality of text entries, a first cluster of text entries associated with a first rating, and a second cluster of text entries associated with a second rating;

receive a first set of manually generated grammar rules for each text entry from the first cluster of text entries, and a second set of manually generated grammar rules for each text entry from the second cluster of text entries;

generate training data from the first cluster of text entries, the first set of manually generated grammar rules, the second cluster of text entries, and the second set of manually generated grammar rules, wherein generating the training data further comprises:

splitting a text entry and its manually generated grammar rule into a first subsequence of the text entry and a second subsequence of the manually generated grammar rule; and train a grammar classifier with the training data, wherein the manually generated grammar rules are used as labels during training, and wherein the grammar classifier is configured to predict a grammar rule based on input text.

15. The system of claim 14, wherein the one or more computer hardware processors are configured to execute further computer-executable instructions to at least:

apply the grammar classifier to input text, wherein output of the grammar classifier comprises a predicted grammar rule for the input text; and cause presentation, in a graphical user interface, of the input text and the predicted grammar rule.

16. The system of claim 15, wherein the one or more computer hardware processors are configured to execute additional computer-executable instructions to at least:

receive, via the graphical user interface, a corrected grammar rule for the input text;

generate updated training data comprising the input text and the corrected grammar rule; and train a new grammar classifier using the updated training data.

17. The system of claim 14, wherein the one or more computer hardware processors are configured to execute further computer-executable instructions to at least:

apply the grammar classifier to a first text entry, wherein output of the grammar classifier comprises a predicted grammar rule for the first text entry;

extract, from a second text entry, a topic using the predicted grammar rule; and cause presentation, in a graphical user interface, of at least a portion the second text entry, an item associated with the second text entry, and the topic.

18. The system of claim 14, wherein the one or more computer hardware processors are configured to execute further computer-executable instructions to at least:

apply the grammar classifier to a first text entry, wherein output of the grammar classifier comprises a predicted grammar rule for the first text entry;

extract, from a second text entry, an aspect and a sentiment using the predicted grammar rule; and cause presentation, in a graphical user interface, of at least a portion of the second text entry, the aspect, and the sentiment.

19. The system of claim 18, wherein the one or more computer hardware processors are configured to execute additional computer-executable instructions to at least:

group a collection of items into a niche based on a common search term for at least some of items from the collection of items, wherein the first cluster of text entries and the second cluster of text entries are associated with an item from the niche; and cause presentation, in the graphical user interface, of the niche.

20. The system of claim 14, wherein grouping, from the plurality of text entries, the first cluster of text entries associated with the first rating further comprises:

selecting, from the plurality of text entries, a text entry with a rating value between a first range of values.

\*　　\*　　\*　　\*　　\*